FIG. 3.

INVENTOR,
B. J. Pilliner

Sept. 19, 1967  B. J. PILLINER  3,342,144
METHOD OF AND APPARATUS FOR ROLLING A FIBROUS LAMINA
Filed July 6, 1964  10 Sheets-Sheet 3

INVENTOR
B. J. Pilliner

INVENTOR
B. J. Pilliner

United States Patent Office 3,342,144
Patented Sept. 19, 1967

3,342,144
METHOD OF AND APPARATUS FOR ROLLING A FIBROUS LAMINA
Bernard Joseph Pilliner, Chandler's Ford, England, assignor to Rational Automation Limited
Filed July 6, 1964, Ser. No. 380,353
Claims priority, application Great Britain, July 11, 1963, 27,484/63
28 Claims. (Cl. 107—9)

This invention relates to methods of, and apparatus for, forming items of rolled confectionery. It is a primary object of the invention to provide such a method and apparatus which allows the obtaining of a roll of baked sponge cake, particularly that known as a "Swiss roll," which is tightly wound from the centre.

The rolling up of Swiss rolls has previously always been effected by hand, as the baked sponge cake passes in a strip along a conveyor. Although the consistency and characteristics of sponge cake make this rolling operation slightly difficult, the subtleties of manual control have enabled it to be done satisfactorily. However, in providing a machine which will perform this function, two basic types of sponge cake must be distinguished. That used in making a smaller size of Swiss roll is thinner, more lightly baked, and therefore has no crust which complicates the rolling. That used in making a larger size of Swiss roll is somewhat thicker and longer baked, so that the crust formed on one side of the cake makes it difficult to roll tightly without the danger of the material breaking.

According to the invention there is provided a method of forming articles of rolled confectionery comprising the steps of moving a strip of confectionery on a support member transversely of the direction in which the surface of a rolling device moves, lowering a surface of the rolling device into contact with one edge of the strip, and causing said surface to move in the direction of the opposite edge of the strip whereby said one edge of the strip is entrained by the surface and the strip is rolled into a spiral about that edge between the surface and the support member.

According to a further feature of the invention, there is provided an apparatus for forming a strip of confectionery lying on a support member moving transversely of the apparatus into a roll comprising a rolling device, means for moving said rolling device towards and away from the support member between an out-of-the-way position and a rolling position, the rolling device having a surface capable of entraining the material of said strip and of movement relative to said support member so as to engage one edge of said strip and roll it up about said one edge against said support member and mounting means for the device capable of movement in the direction of the strip advance.

The various features and advantages of the invention will become clear from the description of a method of, and apparatus for, the rolling up of Swiss rolls of the larger type. In the drawings.

It is convenient first to describe the basic operation of a rolling apparatus and thereafter to describe a particular embodiment.

Figure 1:
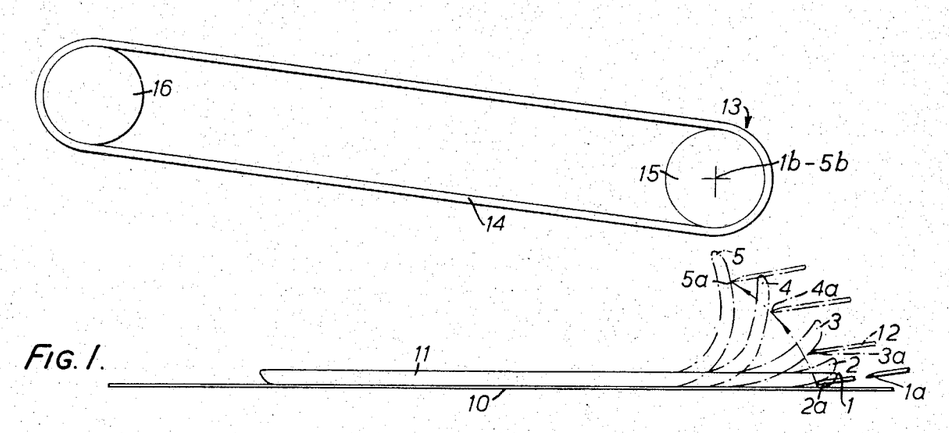
FIGS. 1 and 2 show the method and apparatus diagrammatically indicating the sequence of operations.
Figure 2:
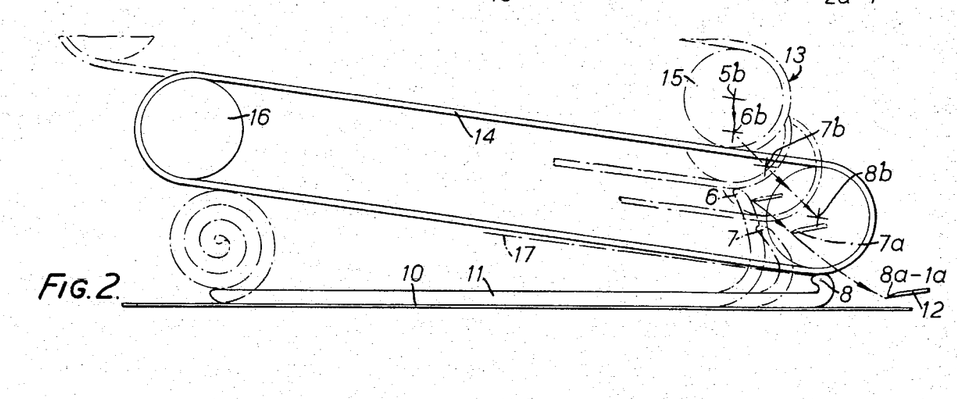

In FIGS. 1 and 2, the conveyor belt 10 seen in section is travelling out of the plane of the drawing. It carries a strip 11, about ⅜" thick and 12" to 13" wide, of baked sponge cake, which has been placed upside down on the belt 10 so that the "crust" side is downwards, and which has been cut transversely into appropriate lengths, say 6" to 8". The upper surface of the strip 11 is coated with jam or cream. The conveyor belt 10 is moving continuously and the rolling apparatus therefore is also caused to move in the same direction so that there is no relative movement during the rolling operation. The apparatus flies back to start the next operation.

The rolling apparatus consists basically of a lifting knife 12 extending along the edge of the strip 11 and a rolling device generally indicated 13. The rolling device 13 consists of a continuous band 14 running round two rollers 15, 16, the band 14 overlying almost completely the strip 11, and extending beyond the left-hand edge, as seen in FIGURE 1. The lifting knife 12 and the rolling device 13 usually extend over a little less than the cut length of the strip so as to avoid fouling the adjacent cut lengths.

The chief difficulty in rolling the larger Swiss rolls lies in starting the roll, particularly due to the fact that the outer surface is comparatively hard, and the sponge tends to bend unevenly unless subjected to some prior treatment to render it more flexible. Thus, most attention is directed to this initial stage in which the apparatus breaks up the stiffness of the sponge, thus enabling the roll to be started off tightly on an even spiral.

The positions of the edge of the strip 11, the lifting knife 12 and the centre of the roller 15 are indicated at different stages of the rolling procedure, by the reference numerals 1 to 8, 1a to 8a and 1b to 8b, respectively. The rolling device 13 plays no part at the start as indicated by positions 1b to 5b in FIGURE 1. The lifting knife starts at position 1a in FIGURE 1 and after moving forwards to a position 2a just under the edge of the strip 11, lifts the edge through positions 2, 3 and 4 to 5, itself moving from 2a to 5a. The strip is not, during this operation, bent sharply at any point, so that the crust is not severely cracked, nor however is it in a suitable position to form the start of the roll.

In order to form a tighter curl to start the roll, the rolling device 13 is brought into play. As seen in FIGURE 2, with the band 14 stationary, the roller 15 is first lowered almost vertically from position 5b to 6b, so that it contacts the upstanding edge of the strip 11. From this point the roller 15 follows the path 6b–7b–8b, pushing the strip downward and backwards through positions 6 and 7 to 8. The effect of this is to break up the crust slightly in numerous places so that the strip can easily be rolled, while not actually breaking it severely so that it comes apart into two pieces. During this part of the operation, the lifting knife 12 moves back to its starting position 8a, 1a along the path shown. The knife may however be used to guide the edge of the strip as it is forced downwards and backwards by the roller.

Once in the position 8b, the belt 14 is started rotating forwards causing the strip to be rolled forwards. The belt must have a sufficiently rough surface to grip the surface of the strip 11. Further, the locus of the upper surface of the roll as it progresses is not the broken straight line 17, but a curve which is conveniently provided for by the slackness in the belt. Once completely rolled, the entire rolling device is lifted clear of the Swiss roll to enable the latter to be moved off the conveyor belt 10 or to be turned transversely so that it does not foul the adjacent strip 11.

If desired, the length and speed of band 14 may be such that the finished roll continues to be propelled in the direction of rolling over the edge of conveyor belt 10 and into the receiving apparatus of a wrapping machine.

The belt 14 may consist of a number of belts placed side by side so that the effective width may be varied.

It is also possible to arrange that the apparatus rolls up two or three Swiss rolls in the same operation, by making band 14 and knife 12 of suitable width to operate on the required number of pieces of cut sponge simultaneously.

Apparatus suitable for rolling the smaller Swiss rolls can be rather simpler, since the sponge in this case does not have a hard crust on one side. The need therefore to break up this stiffness does not arise, and in its simplest form, the apparatus need be only a moving band. However, apparatus will now be described which is suitable for performing the more complicated operations required by the larger Swiss rolls.

Figure 3:
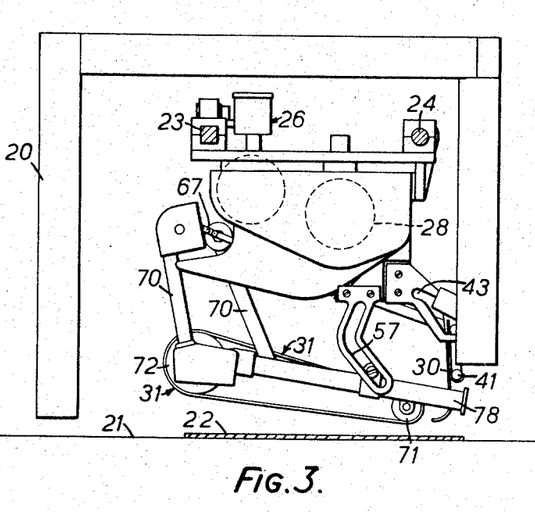
FIGS. 3, 4 and 5 show respectively an end elevation, a side elevation and a plan view, of the general arrangement of the machine.
Figure 4:
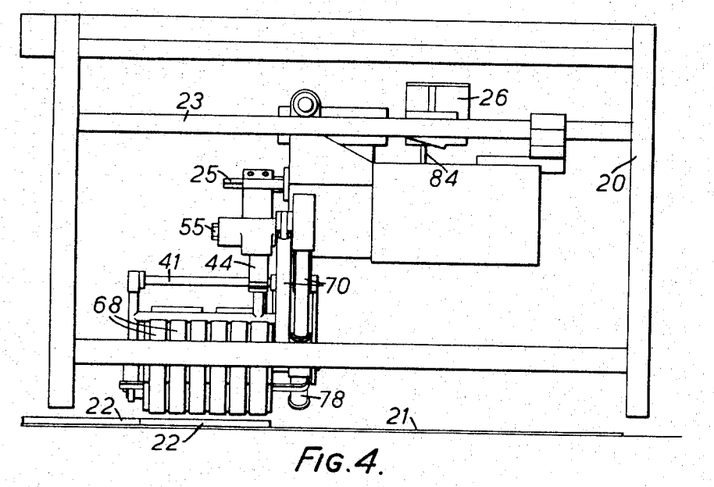
Figure 5:
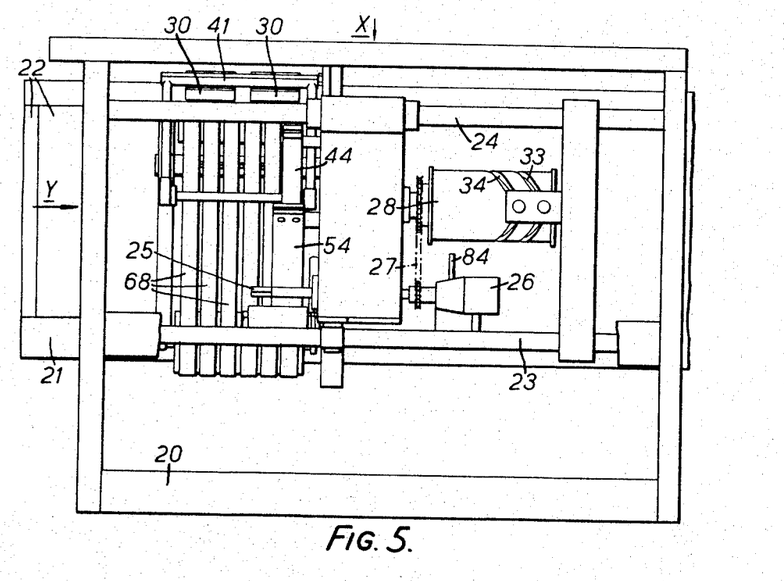

As seen in FIGS. 3, 4 and 5 the apparatus is mounted on a framework 20 above a conveyor belt 21 moving in the direction of the arrow Y. The conveyor belt 21 carries a continuous strip of baked sponge or pastry, which strip has been cut transversely into short lengths 22. The apparatus rolls each narrow strip of pastry transversely to its direction of motion without the motion being stopped, and the rolls emerge on the other side of the apparatus, still on the conveyor belt 21 but turned at an angle by an apparatus which is quite conventional and will not be described. In order that the rolling up operation can be achieved while the belt is in motion, the apparatus is movable on its frame 20 along two horizontal guide members 23, 24.

The mechanical drive to the apparatus is provided by a continuously rotated shaft 25 which is synchronized with the apparatus which cuts the pastry transversely. This drive provides for the operation of the lifting knife and rolling device, as well as for the movement of the apparatus parallel with the moving pastry. The drive is passed through a clutch generally designated 26 and a chain and sprocket drive 27 to a traverse device 28 which causes slow forward movement of the apparatus with the pastry during the rolling operation and a rapid flyback to begin the next operation. The rolling operation is effected by a lifting knife 30 and a rolling device generally indicated 31.

Figure 6:
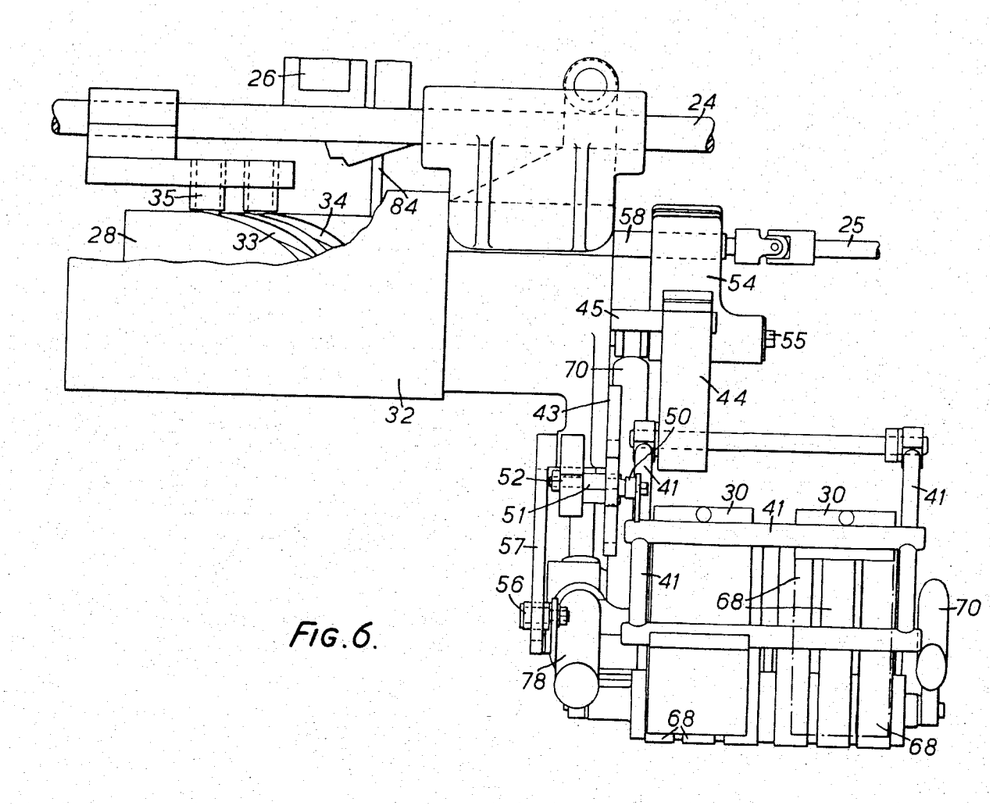
FIG. 6 is an enlarged side elevation of the mechanism shown in the direction of the arrow X in FIG. 5, with the supporting framework omitted.
Figure 7:
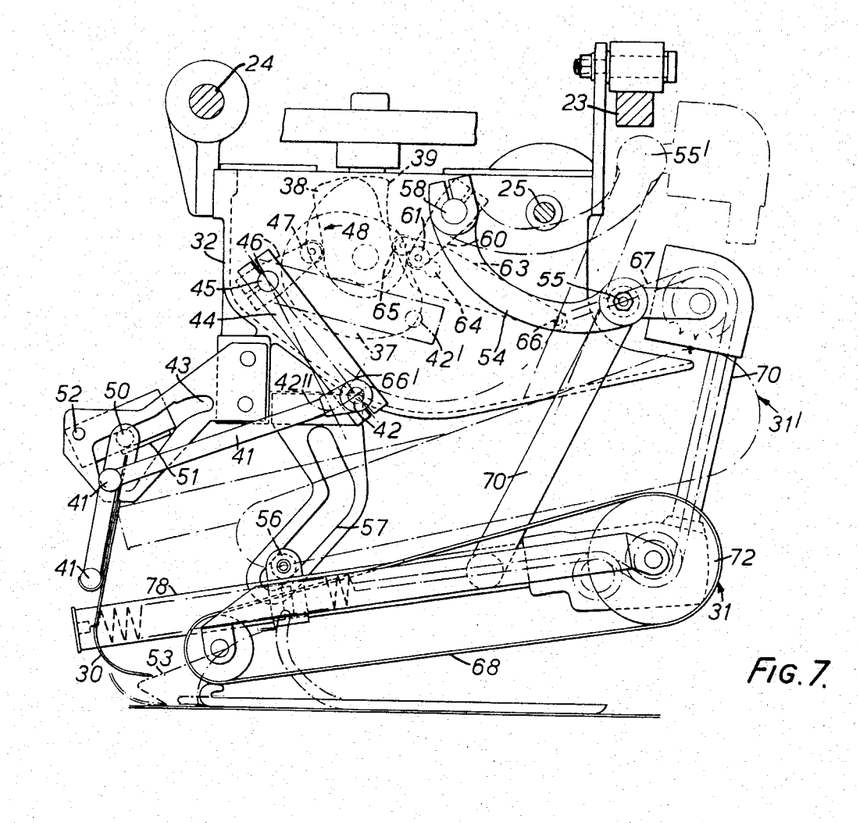
FIG. 7 shows an enlarged end elevation in the direction of the arrow Y in FIG. 5, showing the motions of the mechanism.
Figure 8:
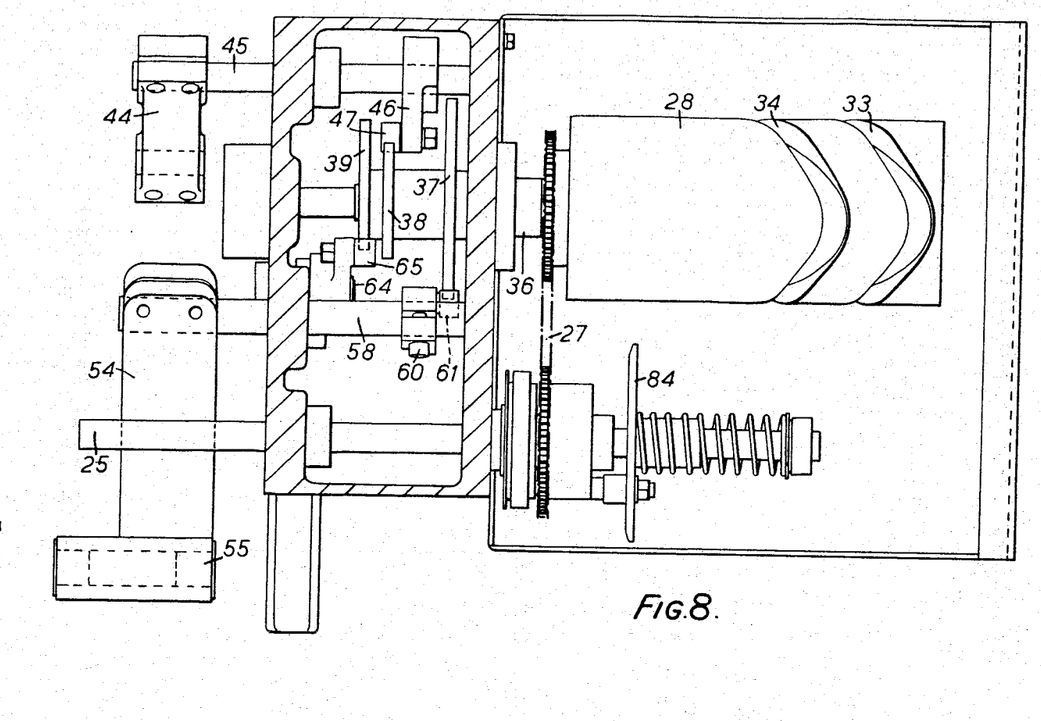
FIG. 8 is an enlarged plan view of the mechanism.

The apparatus is shown in greater detail in FIGS. 6, 7 and 8, without its supporting structure and, in FIG. 8, without its top cover plates. The control mechanisms are contained within housing 32 and the lifting knives and rolling device are cantilevered from, and suspended below, this housing.

In this machine, there are provided two lifting knives 30, movable to accommodate different widths of sponge, and the rolling device 31 also being of variable width by dismounting a portion of the rolling device. The bodily movement of the whole apparatus is achieved by means of the traverse device 28, which is fixed to the apparatus and which has two cam tracks 33, 34, in its cylindrical surface, only one of these at any time cooperating with a pin 35 which is rigidly fixed on the framework. As the traverse device is rotated by the chain drive 27 the curved slots in its surface cause bodily movement of the whole apparatus. The second cam track and the second position for the pin 35 provide for the slightly different movement of the apparatus when rolling slightly shorter Swiss rolls.

As seen in FIG. 8, the shaft 36 upon which the traverse device 28 is mounted extends also away from the latter and carries three cams 37, 38 and 39 which provide for the cyclical movement of the knife edges and the rolling device. Three different motions are required: one for the bodily movement of the knife edges, a second for the bodily movement of the rolling device, and the third for the intermittent movement of the belts on the rolling device.

These motions are best seen from FIG. 7 which indicates the extreme positions of the mechanism in each case. The knife edges 30 are supported from a rigid frame 41 which is in turn supported by a shaft 42 and a guide wheel 50 which moves within a generally triangular cam track 43. The shaft 42 is mounted rotatably on one end of an arm 44, which is clamped on a pivot rod 45. Also clamped on rod 45 is a cam follower arm 46 with a cam follower 47 bearing on cam 38. Rotation of the cam 38 in the direction of the arrow 48 causes angular movement of the arm 44 so that the shaft 42 moves between the position 42′ and 42″ shown in chain dotted lines. While the arm 44 performs this motion, a guide wheel 50 rigidly located on frame 41 moves within the guide slot 43. As the arm 44 moves downwards, the wheel 50 drops under gravity off the end of the plate 51 to the bottom of the guide slot, passes up the right hand surface of the guide slot beneath the plate 51, forcing the latter upwards, as far as the right hand end of the slot 43, and then back, riding over the top of the plate 51 which has in the meantime fallen under gravity, pivoting about pivot point 52. In the result, the knife edges 30 are caused to move along the locus 53, fulfilling the function described in the previously noted sequence of operation.

The roller device 31, the construction of which will be described in more detail later, moves between the position shown and a position 31′ shown in chain dotted line. The device is suspended between one end of an arm 54, upon which it is rotatably mounted at pivot 55, and a cam wheel 56, running in a guide way 57. The arm 54 is clamped upon shaft 58, upon which is also rigidly clamped a cam follower arm 60 having a cam follower 61 which bears upon cam 37. Under the action of the cam and cam follower, the pivot 55 is moved between the position shown and the position 55′.

The third cam 39 is used to produce the intermittent motion of the belts 68 on the rolling device 31. A lever 63 is pivoted at 64 and carries a cam follower 65. At the other end of the lever 66 is attached a chain 67 which passes into the hollow framework of the rolling device 31 and there operates the belts 68 in a manner which is described later. The arm 63 can pivot between the position shown and the position 66′.

Figure 9:
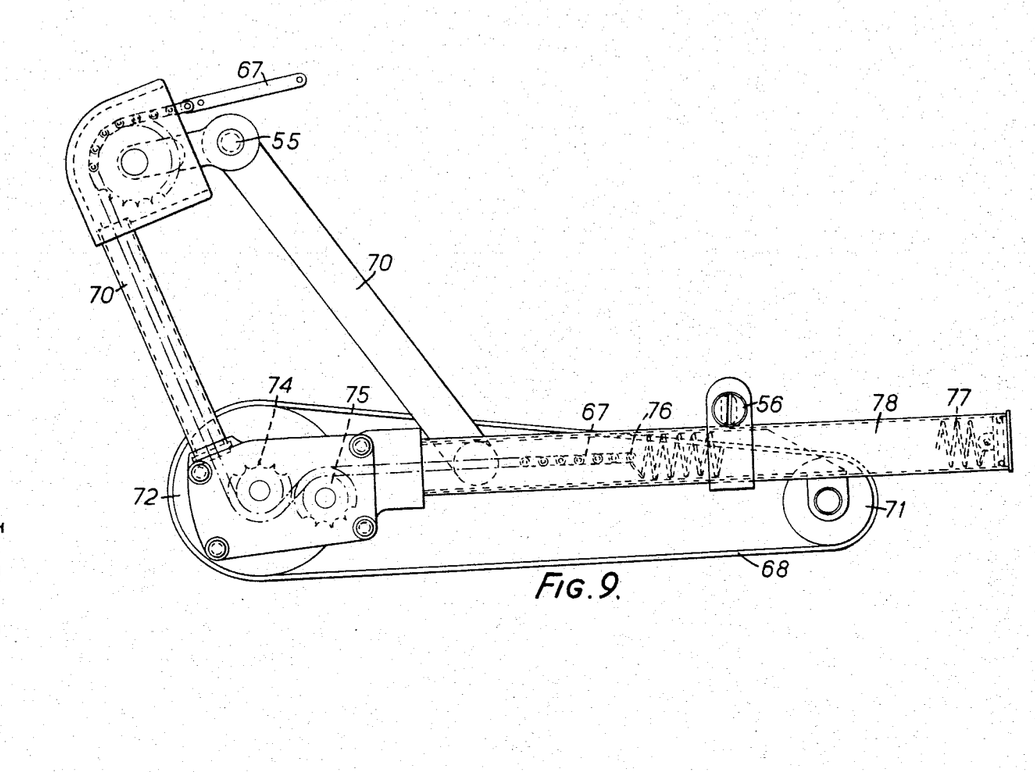
FIGS. 9 and 10 are respectively an enlarged elevation and plan view of the rolling device.
Figure 10:
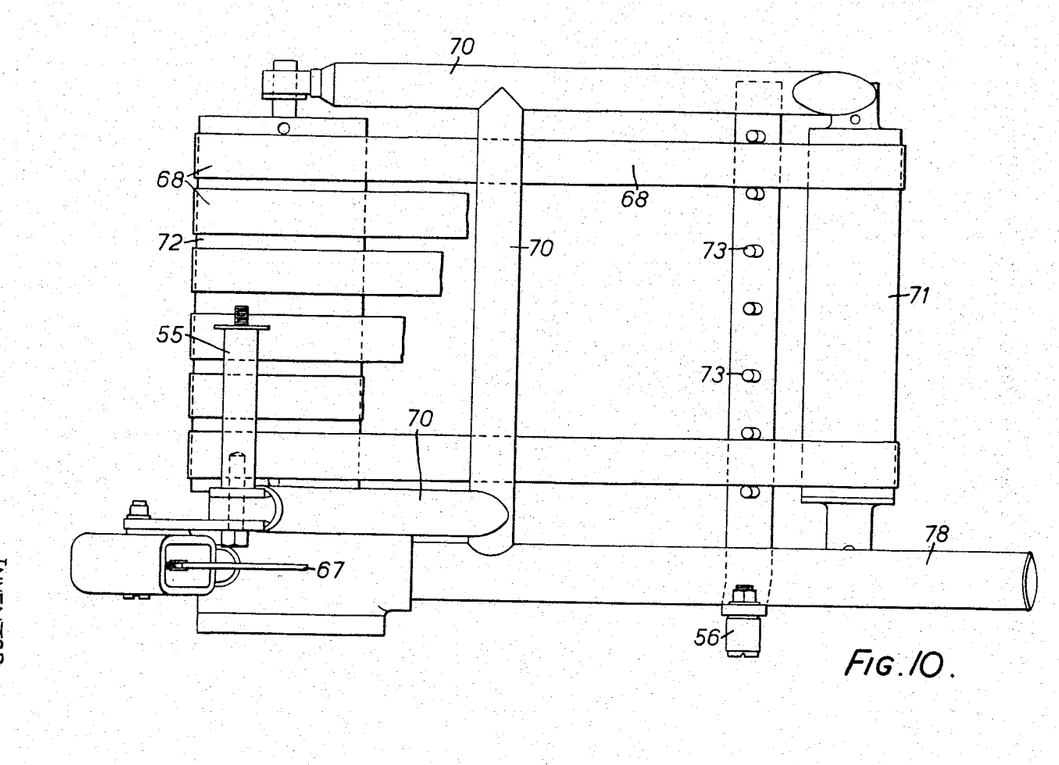

The operation and construction of the rolling device 31 will now be described in more detail with reference to FIGURES 9 and 10. The device has a rigid framework 70 which carries a small roller 71 and a larger roller 72 around which are stretched the rolling belts 68. These are in this instance six narrow belts 68 positioned side by side and guided between upstanding pegs 73 on the framework 70. The number of belts in this instance governs the width of the rolling device. The belts 68 are of neoprene and their outer surface is ridged transversely of their length so as to provide a good frictional grip against the sponge cake. The rolls 71, 72 are cantilevered from one side of the framework so that the belts can easily be dismounted.

As previously explained, the belts are driven by the chain 67 which passes into the hollow framework at the top, around a ratchet wheel 74 attached to the roller 72, around an idler wheel 75 and is attached at 76 to one end of a return tension spring 77, housed within the tube 78. Withdrawal of the chain 67 against the tension of spring 77 causes rotation of the rollers and belts. Once the pastry has been rolled up, and there is no need for further rotation of the belts, the pull on the chain can be releasd which therefore returns under the action of the spring 77. The ratchet wheel 74 drives the roller 72 through a conventional free wheel device which allows the chain to return without driving the roller 72 and the belts 68 backwards.

Figure 11:
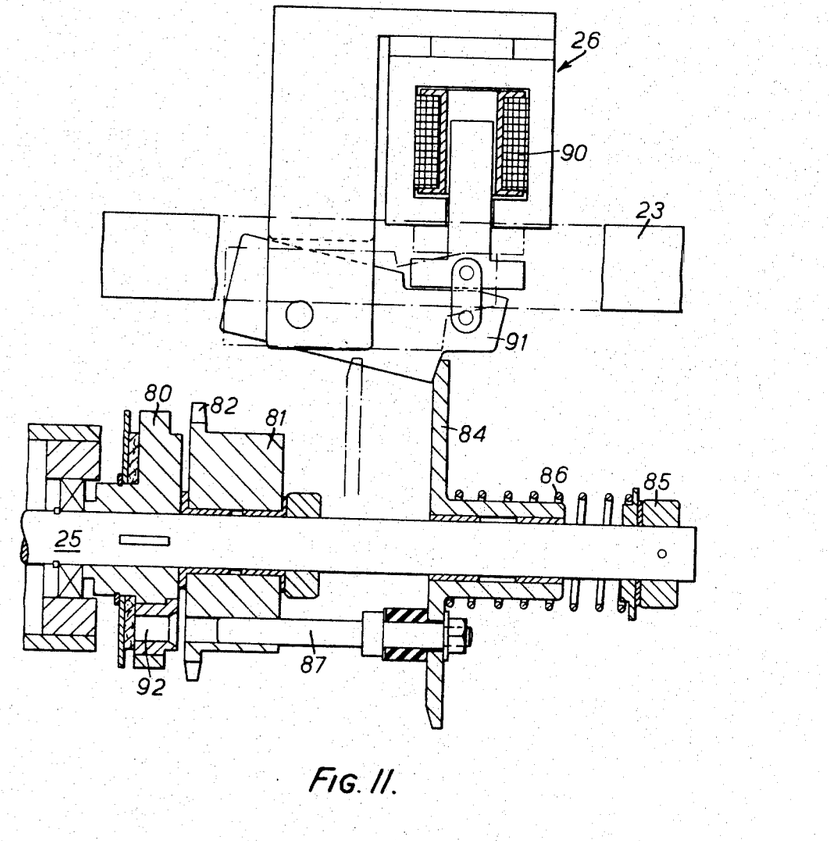
FIG. 11 is a sectional elevation view of the clutch.

Since the drive to the rolling machine is conveniently provided from the same mechanism as provides the drive to the machine which cuts the pastry transversely, it is also necessary to ensure that the machine is synchronized to start its operation at the precise moment of arrival of the cut pieces, rather than to operate upon half of two separate slices. This is achieved by ensuring that the apparatus can be started in motion at precisely the same point in each revolution of the input drive shaft 25, one revolution of which produces one operating cycle. FIGURE 11 shows how this is done by means of a clutch which has only one point of engagement between the driving and the driven member, which is shown in sectional elevation. The drive shaft 25, which moves longitudinally with the apparatus and has a splined connection to allow for this, has mounted upon it, in order, a clutch driving member 80, a clutch driven member 81 with a driving sprocket 82, a clutch operating disc 84, and an end stop 85. The driving member 80 and the end stop 85 are keyed to and fixed longitudinally on the drive shaft 25, the driven member 81 is rotatable on the shaft, and the clutch operating disc 84 is both rotatable and longitudinally movable on the shaft 25 against a compression spring 86 which abuts the end stop 85. A clutch pin 87, mounted on the clutch operating disc 84 normally provides a drive connection between the driving member 80 and the driven member 81. The clutch is controlled electrically by a solenoid 90 having a latch member 91. When de-energized for example by manual switching, the latch member 91 is allowed to drop so that a shoulder engages the clutch operating disc 84.

The operation of the clutch is then as follows: The device is shown in the disconnected position after a break in the operation of the apparatus. As soon as it is desired to re-start operation, the solenoid 90 is energized, raising the latch member 91. The clutch operating disc 84 moves towards the left in FIG. 11 under the action of spring 86 until the pin 87 meets the right hand surface of the clutch driving member 80. The latter is rotating with shaft 25 but no drive is being transmitted to the driven member 81. The driving member 80 rotates until the pin 87 is aligned with a bore 92 when it moves forward again to link mechanically the members 80 and 81. The chain drive 27 is then continued to the traverse device 28 whereupon the operation of the apparatus is continued.

When it is desired to cease operation of the apparatus, e.g. because of a fault or gap in the sponge, a solenoid 90 is de-energized and the latch member 91 allowed to drop. Operation continues until the operating disc 84 moves to the right of the shoulder of the latch member 91, and finally abuts the shoulder. The drive continues to move the apparatus towards the left compressing the spring 86 between the operating disc 84 and the end stop 85. The pin 87 is thus withdrawn from the bore 92 as the apparatus moves towards the left and once the drive between members 80 and 81 is discontinued, the apparatus moves a little further under inertia to the position shown. The shaft 25 continues to rotate. A back stop is provided within the mechanism to prevent the whole apparatus being moved backwards by the compression spring 86. Switching of the solenoid may be performed manually, or automatically by a device monitoring the sponge to detect gaps as they approach the apparatus.

Figure 12:
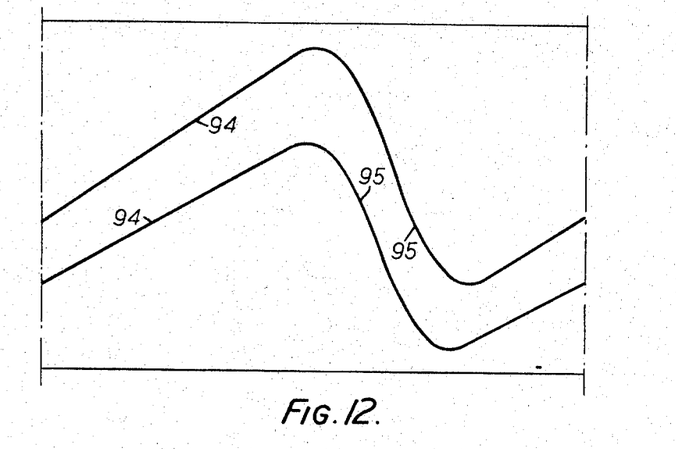
FIG. 12 is a developed view of the cam slots on the traverse device.

FIGURE 12 shows a developed view of the centre lines of the cam tracks on the traverse device 28. It will be noted that portions 94 of the tracks provide a slow movement in one direction for the rolling operation, and portions 95 a fast return movement for the start of the next operation. The traverse device is provided with an overload clutch device which allows the chain drive to continue rotating should any part of the mechanism become jammed solid.

Figure 13:
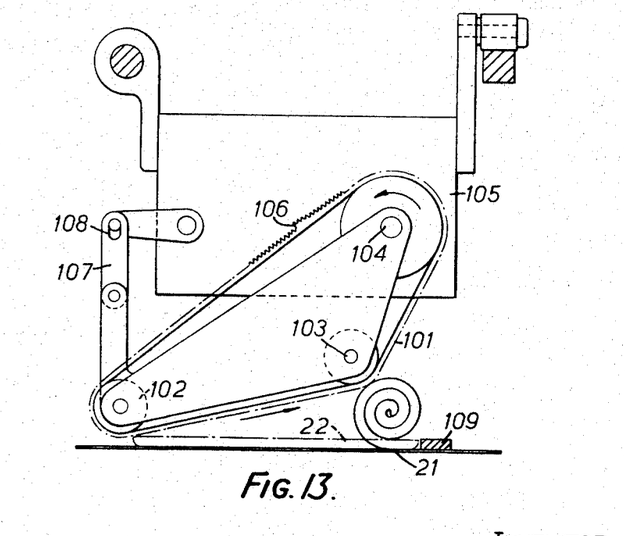
FIG. 13 is a schematic end view of a simplified form of apparatus for rolling the smaller type of Swiss roll.

FIGURE 13 illustrates schematically a rather simpler apparatus which can be used to roll up Swiss rolls of the smaller size. It will be realized that the principles upon which the apparatus operates are the same as previously described, but the more lightly baked sponge does not require its crust to be broken up first. Thus the lifting knife is not required and the pastry is simply rolled up by a moving band.

In FIG. 13, the band 101 moves continuously or intermittently around rollers 102, 103 and 104. The rollers and their driving mechanisms are mounted on and in a housing 105 which moves longitudinally in synchronism with the cut pieces on the belt. The band has a roughened surface, and may have raised teeth 106 at intervals to assist in "picking-up" the end of the strip to start the roll. In order to be able to lift the moving band clear of the pastry during longitudinal movement, and also to allow for the increasing diameter of the roll as it progresses, a lifting mechanism 107 is provided, and a small degree of free movement permitted by slot 108. Transverse slipping of the pastry is prevented by a stop 109.

I claim:

1. A method for forming articles of rolled confectionery with a movable rolling device, said method comprising the steps of moving a strip of confectionery on a support member transversely of the direction in which the surface of said rolling device moves, lowering said surface of the rolling device in contact with one edge of the strip, and causing said surface to move in the direction of the opposite edge of the strip whereby said one edge of the strip is entrained by the surface and the strip is rolled into a spiral about that edge between the surface and the support member, wherein said strip is itself moving transversely of the direction in which said surface of the rolling device moves and said rolling device is moved correspondingly during the rolling operation.

2. A method according to claim 1 including the step of moving the rolling device back to a starting position to perform a subsequent operation after completing one rolling operation.

3. A method of forming articles of rolled confectionery comprising the steps of placing a strip of confectionery on a support member, raising one edge of the strip by means of a knife edge so as to curve the strip with a large radius of curvature, moving a rolling device downwardly against the raised edge of the strip so as to force the strip to assume a curve of much smaller radius of curvature and thereafter by movement of a surface of said rolling device, rolling the strip into a spiral about its curved edge between the surface and the support member.

4. A method according to claim 3 wherein said strip is itself moving tranversely of the direction in which said surface of the rolling device moves and said knife edge and said rolling device are moved correspondingly during the rolling operation.

5. A method according to claim 4 including the step of moving the knife edge and rolling device back to a starting position to perform a subsequent operation after completing one rolling operation.

6. A method according to claim 3 including the step of employing the knife edge to support the edge of the strip while it is forced downwardly by the rolling device.

7. A method according to claim 3 wherein the movement of said surface is not started until the edge of the strip has been forced to assume its smaller radius of curvature.

8. A method according to claim 3 including the step of lifting the rolling device clear of the rolled confectionery once the rolling operation is complete.

9. Apparatus for forming a strip of confectionery lying on a support member moving transversely of the apparatus into a roll comprising a rolling device, means for moving said rolling device towards and away from the support member between an out-of-the-way position and a rolling position, the rolling device having a surface capable of entraining the material of said strip and of movement relative to said support member so as to engage one edge of said strip and roll it up about said one edge against said support member, and mounting means for the device capable of movement in the direction of the strip advance.

10. Apparatus according to claim 9 wherein said surface of said rolling device is inclined upwardly relative to the support member.

11. Apparatus according to claim 10 wherein said surface has a first portion capable of engaging said one edge of the strip and a continuation portion, behind the first position in its direction of movement, which engages the upper surface of the roll as it is formed.

12. Apparatus according to claim 11 wherein said surface is the surface of an endless belt passing round a pair of spaced rollers.

13. Apparatus according to claim 12 wherein said surface is provided by series of belts side by side.

14. Apparatus according to claim 13 wherein said surface is of neoprene and is ridged to ensure frictional grip against the strip.

15. Apparatus according to claim 9 wherein the mounting means is supported on overhead rails.

16. Apparatus according to claim 9 wherein the mounting means moves slowly in one direction to keep pace with a strip of confectionery moving beneath and moves back rapidly to its starting position.

17. Apparatus according to claim 16 wherein during the slow movement of the carriage in one direction the rolling operation is arranged to take place and during the fast return movement the rolling device is lifted clear of the strip on the support member.

18. Apparatus according to claim 9 wherein the movement of the mounting means is determined by the rotation of a cylindrical traverse device having a cam track which engages a fixed stop.

19. Apparatus according to claim 12 wherein said belt is rotated only intermittently.

20. Apparatus according to claim 12 wherein said belt is rotated only after it has been brought into contact with said one edge of the strip until the rolling operation is complete.

21. Apparatus according to claim 12 wherein the belt is rotated by means of a chain drive to a sprocket on one of said rollers.

22. Apparatus according to claim 9 and comprising a knife edge movable so as to engage under said one edge of the strip and to lift that end above the support member.

23. Apparatus according to claim 22 wherein after said knife edge has lifted the edge of the strip, the surface of the rolling device is lowered to engage said edge of the strip and start the roll.

24. Apparatus according to claim 22 wherein said knife edge is mounted upon said carriage for movement therewith.

25. Apparatus according to claim 9 wherein said rolling device and rough surface are arranged obliquely to the strip to be rolled so as to allow said strip to be moved transversely of its direction of rolling during the rolling operation.

26. Apparatus according to claim 9 wherein the movement of each part of the apparatus is determined by a cam.

27. Apparatus according to claim 26 wherein the drive to the apparatus is provided by a drive shaft in continuous rotation.

28. Apparatus according to claim 27 comprising a clutch device which ensures that the operation of the apparatus is started at the same instant relative to the rotation of the drive shaft.

References Cited

UNITED STATES PATENTS

| | | | |
|---|---|---|---|
| 1,280,467 | 10/1918 | Hicks | 107—9.4 |
| 1,397,981 | 11/1921 | Peters | 107—1 |
| 2,402,874 | 6/1946 | Cohen et al. | 107—9.4 |
| 3,172,372 | 3/1965 | Packman | 107—9.3 |

FOREIGN PATENTS

| | | |
|---|---|---|
| 13,895 | 11/1925 | Netherlands. |

WALTER A. SCHEEL, *Primary Examiner.*

J. SHEA, *Assistant Examiner.*